Jan. 13, 1970   S. W. TONKIN   3,489,057
GUIDANCE BEAM WEAPON SYSTEMS
Filed Dec. 10, 1965   2 Sheets-Sheet 1
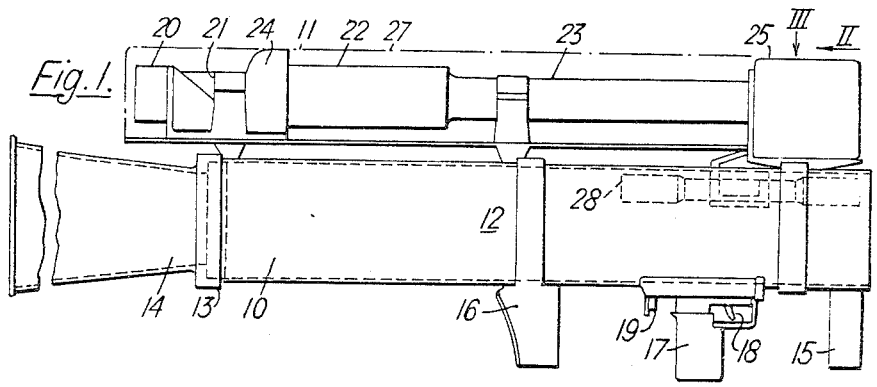
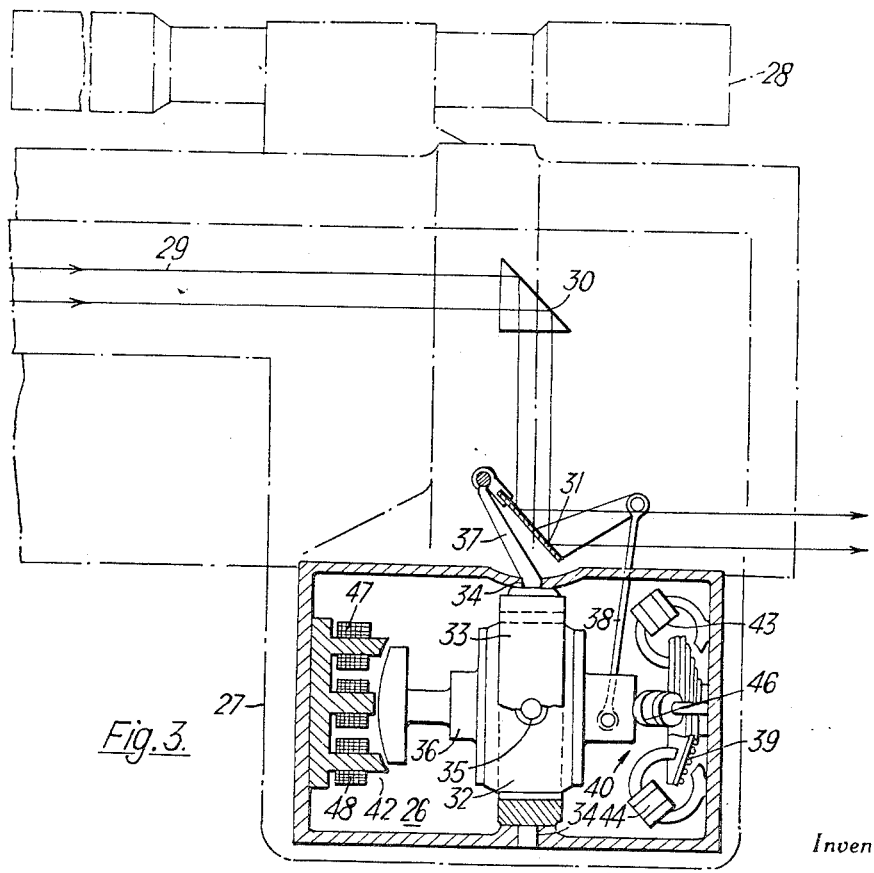
Inventor
Stephen William Tonkin
By
Bailey, Stephens & Huettig
Attorneys

United States Patent Office 3,489,057
Patented Jan. 13, 1970

3,489,057
GUIDANCE BEAM WEAPON SYSTEMS
Stephen William Tonkin, Bristol, England, assignor to British Aircraft Corporation Limited, London, England, a British company
Filed Dec. 10, 1965, Ser. No. 513,676
Claims priority, application Great Britain, Dec. 13, 1964, 33,598/64
Int. Cl. F41f 3/04
U.S. Cl. 89—1.8          3 Claims

ABSTRACT OF THE DISCLOSURE

A projectile launcher is provided with a sighting device, a projector for a guidance beam and a gyroscope. The gyroscope has pick-off windings and torque windings interconnected by a feed-back circuit to cause the gyroscope rotor to follow the angular movement of the launcher. Switching means are provided to render these last means ineffective so as to free the rotor. A mirror which reflects the projected beam is connected to the rotor housing of the gyroscope in such a way as to keep the beam direction substantially constant despite angular movement of the launcher. A memory circuit connected to the pick-offs stores data related to the movement of the launcher just prior to launching and signals from this memory circuit are applied to the torque windings when the feed-back circuit is rendered inoperative. This causes the angular movement of the rotor to continue on the basis of the angular movement in the period preceding launching. The feed-back circuit is rendered effective again after a predetermined time.

---

It is known to equip projectiles with beam riding guidance systems by means of which they can be made to travel along a beam projected from a base station to a target. Difficulties arise when the projectile launcher is a portable hand-held device and the beam projector is mounted on the launcher since the projector is then subjected to undesirable angular movement when the projectile is launched. Moreover, the target may be moving and since the undesirable angular movement of the launcher will last for an appreciable time, the interruption of the tracking of the target may cause complete loss of the target.

According to the present invention, in a launching and guidance system employing a launcher on which are mounted a sighting means, a guidance beam projector and a gyroscope, the gyroscope is provided with pick-off windings and torque windings which are interconnected by a feed-back circuit so that the gyroscope rotor follows the angular movement of the launcher; in addition, the system includes switching means for rendering ineffective the feed-back circuit, thereby freeing the gyroscope rotor, and beam-directing means within the beam projector connected to the rotor in such a manner that when the rotor is free the beam direction remains substantially unchanged in spite of angular movement of the launcher and projector. Finally, a memory circuit is connected to the pick-offs and is arranged to store data relating to the movement of the sighting means and launcher immediately prior to launching of the projectile, the switching means operating upon launching of the projectile to render ineffective the feed-back circuit and to apply signals from the memory circuit to the torque windings of the gyroscope; a delay circuit renders the feed-back circuit effective again after a predetermined period. With this arrangement in the period immediately following launching, the angular movement of the rotor and beam continue under the control of the memory signals in the direction and at the rate which they had in the period immediately preceding launching.

The invention can be applied, for example, to an antitank weapon system including a hand-held gun with sighting means. In use, the operator trains the gun onto a target and in so doing, aligns the guidance beam. The projectile is then fired and after the recoil movement the gunsight and guidance beam are maintained on the target by the operator, the guidance system correcting any trajectory errors by causing the projectile to steer into the beam centre line. The arrangement described above prevents incorrect movement of the projectile which would result if the projected beam followed the angular movement of the gun during recoil.

In the preferred form of the invention the switching means has three positions, in the first of which the gyro is tightly slaved to the launcher axis, this position being used as the launcher is picked up and brought to the aiming position. In the second position, the gyro is still slaved to the launcher axis, but with a lower frequency response so that random movements from the desired tracking or aiming line are smoothed out. In the third position, the feed-back loop is broken and the torque windings are supplied with the memory signals, which maintain the tracking rate without the continuous error signal from the pick-off windings.

In order that the invention may be better understood, one example, in which the guidance beam is a light beam, will now be described with reference to the accompanying drawings. In the drawings:

FIGURE 1 illustrates a side view of a typical launcher for a 100 mm. calibre weapon;

FIGURE 3 is a diagrammatic plan view of the front portion of the launcher, with the gyroscope and housing shown in section.

Figure 2:
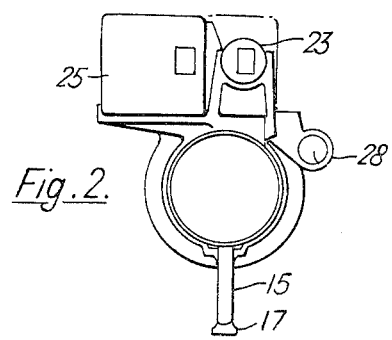
FIGURE 2 is an end elevation of the launcher looking in the direction of the arrow II in FIGURE 1.

In the example illustrated in FIGURES 1 and 2 the launcher consists of two main parts, a gun 10 and an optical projector assembly 11 mounted on a platform on top of the gun. The gun is of the "recoilless" type in which on firing, the forward momentum of the projectile is balanced by the rearward momentum of a proportion of the combustion gas which is exhausted rearwardly to atmosphere. The momentum finally imparted to the gun is small, but such as to cause sufficient gun movement to interrupt steady tracking of a target.

The gun consists of a barrel 12 and a breech 13 to which is attached a vent 14 through which some of the combustion gases are accelerated rearwardly. Attached to the underside of the barrel are a forward stock 15, a shoulder stock 16 and a pistol grip 17. The latter includes a trigger 18 and a cocking lever 19.

The optical projector assembly 11 is arranged to project a guidance beam 29 (FIGURE 3) along the axis of the launcher to a target and consists of a radiation source 20 (FIGURE 1), such as a pulsed gallium arsenide laser, a projection lens system of known design housed within tubes 21, 22 and 23, and a pattern generator, mounted in housing 24, for dividing the beam cross-section into sectors and for rotating this sector pattern. Such an optical projector system for guiding a projectile is described in greater detail in co-pending application No. 417,244, filed Dec. 9, 1964, and now abandoned. To the forward end and to one side of the optical projector assembly there is attached to the gun barrel a housing 25 for a gyroscopically stabilised mirror system 26 (FIGURE 3) to ensure beam stability both before, during and after the projectile launch. The whole projector assembly is covered by a protective casing shown in broken outline at 27.

Below the optical projector assembly and to one side of the gun barrel is mounted a telescopic sight 28 with which an operator locates and tracks a target.

FIGURE 3 illustrates the gyroscopically stabilised mirror system 26 in greater detail. The guidance beam 29 is projected onto a fixed prism 30, turned through 90° and directed onto a movable mirror 31. In the undisturbed position of this mirror the beam is reflected through a further 90° angle so that it emerges from the optical system parallel to its original course and to the longitudinal axis of the gun barrel.

The gyroscopically stabilised mirror system consists of a gyroscope, the stator or rotor housing 32 of which is universally mounted relative to housing 25 by a gimbal ring 33. Gimbal ring 33 is pivotally supported in housing 25 by bearings 34, and the stator 32 is pivotally supported in gimbal ring 33 by bearings 35. The motor of the gyroscope is not seen in the drawing, but one of the bosses which houses a bearing to support the rotor is seen at 36.

In FIGURE 3 the stator 32 is shown in such an attitude that the rotor spin axis is parallel to the longitudinal axis of the gun barrel. An extension 37 to the gimbal ring 33 protrudes beyond the housing 25 and forms a pivotal support for the mirror 31 such that in the pitch plane the mirror moves through an angle equal to that of the gun-to-gyroscope angle. Link 38, which is pivotally connected with the stator 32, provides a further support for the mirror 31. The position of the mirror 31 with respect to its support members 37 and 38 and to the gyroscope stator and gimbal is such that in the yaw plane the mirror 31 always moves through an angle substantially equal to one-half that of the gun-to-gyroscope axis angle. The linkage shown achieves the correct relationship between gyroscope and mirror movement only at its central position, but it is approximately correct over the remainder of its angular sweep and is lighter and cheaper than systems of gearing, for example.

The guidance beam control system will now be described. The moving member 39 of a torque motor generally indicated at 40 is rigidly fixed to the gyroscope stator 32 by a support rod co-axial with the spin axis; and the moving member 41 of an inclination indicator or pick-off, generally shown at 42, is similarly fixed to stator 32 at the other end thereof by a support rod.

Figure 4:
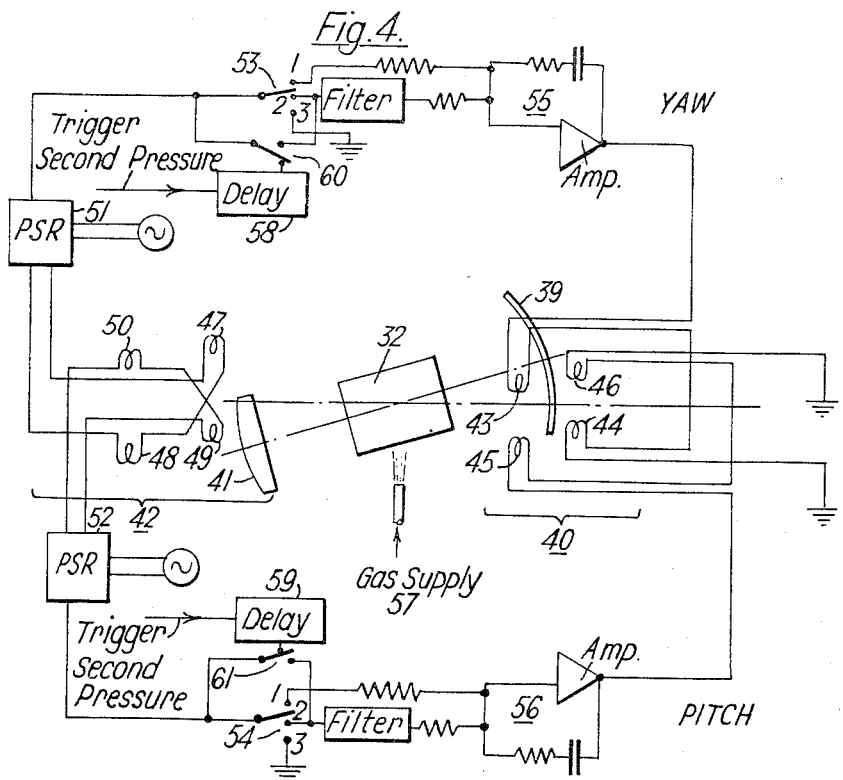
FIGURE 4 is a circuit diagram in block form for the apparatus of FIGURES 1 to 3.

The electrical connections to the gyroscope are shown in more detail in FIGURE 4. The moving member 39 of the torque motor 40 consists essentially of a conducting coil wound upon a dome-shaped former and is arranged to move in the air gaps of four equally spaced electromagnets 43, 44, 45 and 46. Relative variation of the excitation of the four electromagnets will produce a torque to turn the gyroscope stator 32 in any required direction about its gimbal bearings 34 and 35. The moving member 41 of the inclination indicator 42 consists of a dome-faced iron armature, the movement of which causes E.M.F.'s generated in the coils 47, 48, 49 and 50 to become unequal. By connecting the coils in pairs in a suitable manner the resultant E.M.F.'s in the circuits of these pairs of coils indicate the direction and extent of deviation of the gyroscope spin axis from its undisturbed state.

The output signals from the pairs of coils 47, 48 and 49, 50 are passed through phase-sensitive rectifiers 51 and 52 through three-way switches 53 and 54. The switches are mechanically interconnected to operate simultaneously. The terminals corresponding to switch positions 1 and 2 are each connected into a memory network indicated generally at 55 and 56, the outputs of which are fed into the electromagnets 43, 44 and 45, 46 respectively of the gyro torque motor 40. The terminals of switch position 3 are connected to earth.

In this instance the gyroscope motor is shown as gas driven, the gas supply is shown diagrammatically at 57 (FIGURE 4).

In operation an operator will initially set the cocking lever 19 and in doing so will cock the firing pin of the launcher. The cocking lever will also release the gas supply to run up the gyroscope rotor and switch on the electronic circuit. The system is then in the condition described as mode 1 in which the switches 53 and 54 are in position 1. In this condition the gyroscope is tightly slaved to the launcher axis. In the system shown in FIGURE 4 the memory circuits 55 and 56 continuously store information from the pick-off 42 for a period of say one second previously. The information stored is, however, biased toward the more recent signals received.

The operator can in this mode of operation quickly slew the launcher toward a target and then locate it accurately by means of his telescopic sight 28.

The trigger 18 is then given an initial pressure, thereby moving the switches 53 and 54 to position 2. In this position the circuit is modified by the inclusion of a filter so that the beam follows the sight (or rather the launcher axis) but with a lower frequency response. Random movements from the correct tracking path or aiming line are thus smoothed out.

The trigger 18 is then given a final pressure thereby firing the projectile and simultaneously moving the switches 53 and 54 to position 3. The circuits between the pick off 42 and the torque motor 40 are broken so that the torque motor is provided only with signals corresponding to the information stored within the memory circuits 55 and 56. The tracking of the target is thus continued in a smooth uninterrupted fashion during the period of firing the projectile.

Delay devices 58 and 59 actuated by the second of the said pressures applied to the trigger 18 and arranged to trip switches 60 and 61 respectively, ensure that after a brief period the system reverts to the second mode, for guidance until the target is reached.

It will be seen that the memory circuit consists of an electronic amplifier with a capacitor in its feed-back circuit to cause it to operate as an integrator. When a target is being tracked steadily, the integrator capacitor builds up a charge such that no steady error signal is required at the input to the amplifier to maintain a steady output signal to drive the torque motor.

I claim:

1. A projectile launching and guidance system comprising a launcher on which are mounted a sighting means, a guidance beam projector and a gyroscope, the gyroscope including pick-off windings and torque windings interconnected by a feed-back circuit whereby the gyroscope rotor follows the angular movement of the launcher; the system further including switching means for rendering ineffective the feed-back circuit to free the rotor, beam directing means in the beam projector connected to the rotor housing in such a manner that when the rotor is free the beam direction remains substantially unchanged in spite of angular movement of the launcher and projector, a memory circuit connected to the pick-offs of the gyroscope and arranged to store data relating to the movement of the sighting means and launcher immediately prior to launching of the projectile, the switching means operating upon launching to render ineffective the feed-back circuit and to apply signals from the memory circuit to the torque windings, the angular movement of the rotor and beam then continuing on the basis of their angular movement in the period immediately preceding launching; the system further including a delay circuit for rendering the feed-back circuit effective again after a predetermined period.

2. A system in accordance with claim 1, in which the switching means has three conditions, in the first of which the gyroscope rotor is tightly slaved to the launcher, in the second of which the rotor is slaved to the launcher but follows the launcher with a lower frequency response, and in the third of which the feed-back circuit is rendered ineffective and the memory signals are applied to the torque windings of the gyroscope.

3. A system in accordance with claim 1, in which the beam directing means is a pivoted mirror connected to the gyroscope for movement in both pitch and yaw planes in such a manner that upon movement of the launcher axis away from the rotor axis through a given angle, the mirror will pivot in one of said planes substantially through one-half of the said angle.

References Cited

UNITED STATES PATENTS 2,930,894  3/1960  Bozeman _____ 244—3.11 X

VERLIN R. PENDEGRASS, Primary Examiner

U.S. Cl. X.R.

244—3.13